(12) United States Patent
Ullein et al.

(10) Patent No.: US 7,220,196 B2
(45) Date of Patent: May 22, 2007

(54) CHAIN DRIVE FOR AN INTERNAL COMBUSTION ENGINE

(75) Inventors: Thomas Ullein, Frensdorf (DE); Bolko Schuseil, Adelsdorf (DE); Jeff Hewitt, Windsor (CA)

(73) Assignee: INA-Schaeffler KG (DE)

( * ) Notice: Subject to any disclaimer, the term of this patent is extended or adjusted under 35 U.S.C. 154(b) by 0 days.

(21) Appl. No.: 10/310,899

(22) Filed: Dec. 5, 2002

(65) Prior Publication Data

US 2003/0125145 A1 Jul. 3, 2003

(30) Foreign Application Priority Data

Dec. 13, 2001 (DE) ................. 101 61 414

(51) Int. Cl.
*F16H 7/08* (2006.01)
*F16H 7/18* (2006.01)
*F16H 7/22* (2006.01)

(52) U.S. Cl. ................. 474/111; 474/140; 474/109

(58) Field of Classification Search ........ 474/109–111, 474/140; 123/90.17, 90.23, 90.31, 90.33, 123/90.15, 90.27, 179, 533, 192.2
See application file for complete search history.

(56) References Cited

U.S. PATENT DOCUMENTS

| | | | | |
|---|---|---|---|---|
| 4,480,603 A | * | 11/1984 | Tsuboi ..................... 474/111 |
| 4,553,509 A | * | 11/1985 | Mezger et al. ........... 123/90.27 |
| 4,741,299 A | * | 5/1988 | Matsuura et al. ........ 123/90.33 |
| 4,889,087 A | * | 12/1989 | Bergsten ................... 474/110 |
| 5,083,535 A | * | 1/1992 | Deschler et al. ......... 123/192.2 |
| 5,154,144 A | * | 10/1992 | Okui et al. ............... 123/90.27 |
| 5,255,643 A | * | 10/1993 | Mochizuki et al. ..... 123/179.17 |
| 6,050,914 A | * | 4/2000 | Shimaya et al. ............ 474/109 |
| 6,106,423 A | * | 8/2000 | White et al. ................ 474/109 |
| 6,412,464 B1 | * | 7/2002 | Schneider et al. ....... 123/90.31 |
| 6,431,133 B2 | * | 8/2002 | Brandl et al. ............ 123/90.31 |

FOREIGN PATENT DOCUMENTS

| | | | | |
|---|---|---|---|---|
| DE | 3623903 C1 | * | 12/1987 | ................. 474/11 |
| DE | 4125231 A1 | * | 2/1992 | |
| DE | 4206899 A1 | * | 12/1992 | |
| DE | 4206899 C1 | * | 12/1992 | |
| DE | 4238148 A1 | * | 5/1994 | |
| DE | 10207452 A1 | * | 7/2003 | |
| DE | 10235187 A1 | * | 2/2004 | |
| DE | 10257562 A1 | * | 7/2004 | |
| JP | 56-49451 A | * | 5/1981 | ................. 474/111 |
| JP | 58-146751 A | * | 9/1983 | ................. 474/111 |
| JP | 04-272548 A | * | 9/1992 | ................. 474/111 |

* cited by examiner

*Primary Examiner*—Marcus Charles
(74) *Attorney, Agent, or Firm*—Charles A. Muserlian

(57) ABSTRACT

In a chain drive for an internal combustion engine, said chain drive comprising a driving wheel (2), a driven wheel (3), an endlessly circulating chain (1) that connects the driving wheel (2) and the driven wheel (3), a chain tensioner (9) acting on the slack strand (7) of the chain (1), and an additional tensioning device (12) that is loaded by a spring (13) and acts on the tight strand (6) of the chain (1) while being arranged for pivoting, a further driven wheel (4) is installed in the tight strand (6) of the chain drive and is used as a driving wheel for a rotatably mounted compensating shaft for offsetting free forces and moments that occur during operation of the internal combustion engine.

1 Claim, 1 Drawing Sheet

CHAIN DRIVE FOR AN INTERNAL COMBUSTION ENGINE

FIELD OF THE INVENTION

The invention concerns a chain drive for an internal combustion engine, said chain drive comprising a driving wheel, a driven wheel, an endlessly circulating chain that connects the driving wheel and the driven wheel, a chain tensioner acting on a slack strand of the chain, and an additional tensioning device that is loaded by a spring and acts on a tight strand of the chain while being arranged for displacement by one of pivoting motion, linear motion or elastic deflection.

BACKGROUND OF THE INVENTION

Conventional chain drive systems for internal combustion engines generally work with rigid guide rails. The stresses occurring in such a system are often adjusted by a chain tensioner that is arranged as a rule in the slack strand of the chain. However, the behavior of the chain drive can be influenced only to a limited extent with such a means. In many cases it is determined that the chain tensioner has only a restricted influence on the force in the tight strand that is decisive for the loading of the chain.

A chain drive of the pre-cited type known from the document DE 908 694 already comprises, besides a chain tensioner in the slack strand, an additional tensioning device in the tight strand of the chain. However, the chain runs only on two chain wheels, one of which is the driving wheel and the other, the driven wheel. To render the knocking of the chain as silent as possible and to prevent the occurrence of frictional forces, it is proposed to vulcanize profiled rubber or the like on the tension strip of the chain tensioner. This document does not suggest any further measures particularly such for reducing the force in the tight strand that is determinative for the loading of the chain.

As a rule, the excitations occurring during the operation of internal combustion engines such as the torsional vibrations of the crankshaft and the natural vibrations of driven shafts, lead to a strongly pulsating course of the chain force. This fluctuates constantly between a minimum and a maximum value. In most cases, the minimum value is zero while the maximum value is often a very high value that occurs for a very short period of time, that is to say, it is a peak value. This high value of the force determines the loading of the chain drive components

OBJECTS OF THE INVENTION

It is an object of the invention to provide a chain drive in which the high forces of short duration, i.e. the peak forces, are clearly decreased so that the loading of all the components of the chain drive is reduced.

This and other objects and advantages of the invention will become obvious from the following detailed description.

SUMMARY OF THE INVENTION

The invention achieves the above objects by the fact that at least one further driven wheel is installed in the tight strand of the chain drive and is used as a driving wheel for a rotatably mounted compensating shaft for offsetting the free forces and moments that occur during the operation of the internal combustion engine. In the chain drive of the invention, the peak loads occurring in the tight strand of the chain are strongly reduced by the resilience of the additional tensioning device that is loaded by the spring while being pivotally mounted and resiliently supported and thus configured as an elastic tight-strand rail.

As has been determined in tests, the spring-mounted rail leads to a considerable reduction of forces so that the forces that now occur are in an order of magnitude of only 50% of hitherto encountered forces. The lower forces result in less friction and wear and therefore also in a longer useful life of the chain drive.

The driving wheel of the chain drive is connected to the crankshaft of the internal combustion engine. Due to the relatively rigid coupling of the crankshaft to the compensating shaft through the chain, the torsional vibrations of the crankshaft are transmitted to a large extent to the compensating shaft so that high chain forces are caused. Due to the additional elasticity of the chain drive resulting from the spring-mounted rail of the additional tensioning device, the high chain forces are reduced. The compensating shaft rotates at a substantially uniform speed. The chain length required for the relative rotation between the compensating shaft and the crankshaft is made available by the resilient yielding of the spring-supported tight-strand rail. In the slack strand, this function is fulfilled by the chain tensioner. The compensation of chain elongation due to wear and thermal expansion is still effected by the chain tensioner.

The kind of free forces and moments produced in an internal combustion engine depends on the type of engine (number and arrangement of the cylinders). Because, for instance in a four cylinder engine, the free forces and moments that have to be compensated occur exclusively in the second order, the compensating shaft for an engine of this type must rotate at double the engine speed. This is accomplished by an appropriate choice and matching of the diameter or the number of teeth of the driving wheel that is connected to the crankshaft and of the further driven wheel that is connected to the compensating shaft.

The high moment of inertia of the compensating shaft resulting from its chosen mass and structural configuration is, in itself, an unpleasant secondary aspect. But due to the magnitude of the forces that have to be produced for counteracting the free forces and moments of the engine, it is unavoidable.

The invention will now be described with reference to one example of embodiment and the sole appended FIGURE.

DETAILED DESCRIPTION OF THE DRAWING

Figure 1:
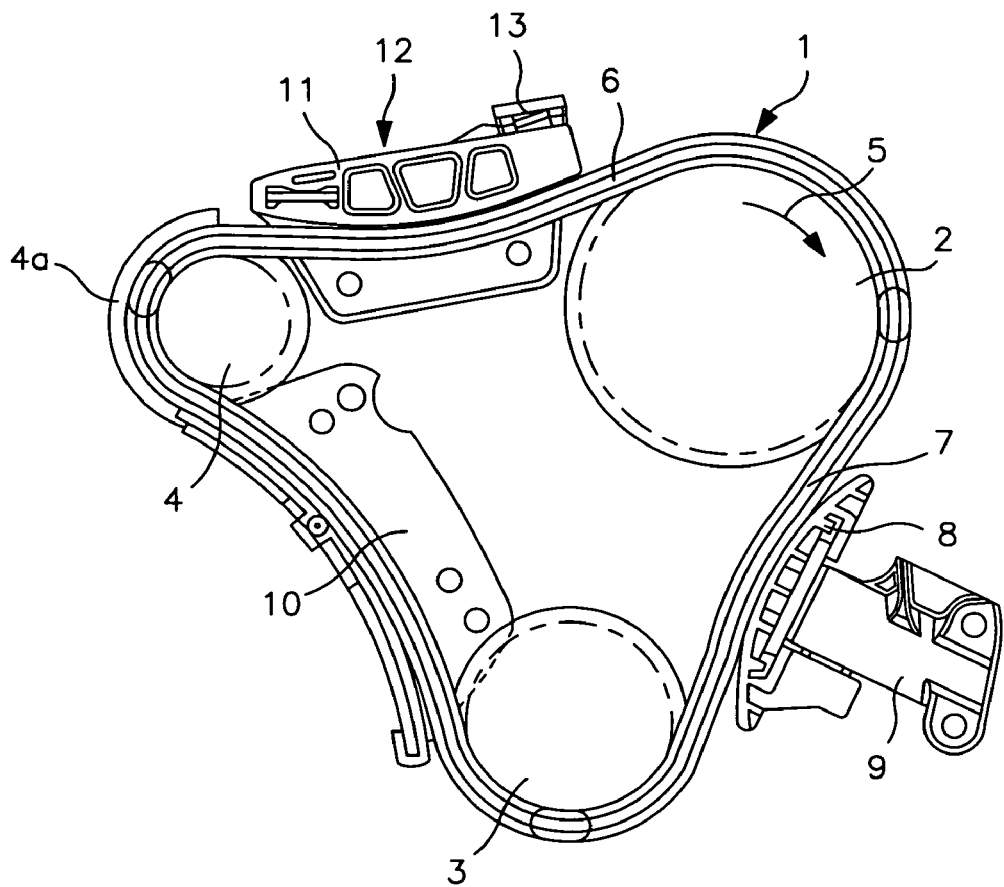
FIG. 1 is a schematic representation of a chain drive for an internal combustion engine.
Figure 2:
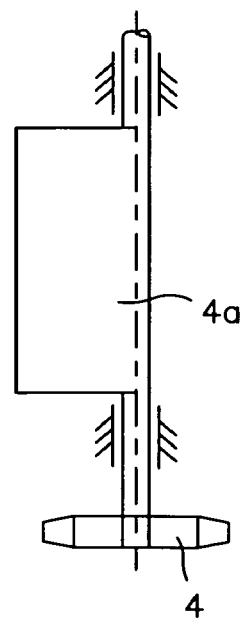
FIG. 2 shows a driven wheel coaxially fixed on a. compensating shaft of the engine.

An endlessly circulating chain 1 meshes with a driving wheel 2, a driven wheel 3 and a further driven wheel 4 while enveloping each of these wheels over a part of its periphery. The driving wheel 2 is coaxially fixed on the crankshaft of an internal combustion engine, while the driven wheel 3 is connected to an auxiliary unit of the engine, for example to an oil pump, or to a compensating shaft. The further driven wheel 4 is coaxially fixed on a compensating shaft 4a of the engine.

During the operation of the internal combustion engine, the driving wheel 2 rotates in direction of the arrow 5. The driving wheel 2 pulls the chain 1 from the driven wheel 3 over the further driven wheel 4 toward itself so that this length of the chain 1 is its tight strand 6. The opposite length of the chain 1 leading from the driving wheel 2 directly to the driven wheel 3 is the slack strand 7 of the chain 1. A movable tension shoe 8 of a chain tensioner 9 acts on this slack strand 7 to compensate the elongation of the chain caused by wear and thermal expansion.

In the region of the tight strand 6 that is situated between the first driven wheel 3 and the further driven wheel 4, the chain 1 is guided in its direction of movement in a stationary guide 10. In the further region of the tight strand 6 that is situated between the driving wheel 2 and the further driven wheel 4, the chain 1 is acted upon by a pivotally arranged guide rail 11 of an additional tensioning device 12 of the chain drive provided in addition to the chain tensioner 9. The pivotable guide rail 11 is elastically supported on a spring 13. The thus structured additional tensioning device 12 makes available the chain length required for the relative rotation between the compensating shaft 4a and the crankshaft and enables a reduction of the peak loads occurring in the chain 1.

What is claimed is:

1. A chain drive for an internal combustion engine, said chain drive comprising a driving wheel, a driven wheel, an endlessly circulating chain that connects the driving wheel and the driven wheel, a chain tensioner acting on a slack strand of the chain, and an additional tensioning device that is loaded by a spring and acts on a tight strand of the chain while being arranged for displacement by one of pivoting motion, linear motion or elastic deflection, at least one further driven wheel is installed in a tight strand of the chain drive, wherein the further driven wheel is coaxially fixed on a rotatably mounted compensating shaft of the internal combustion engine, wherein the additional tensioning device that acts on the chain comprises a guide rail that is mounted for displacement, wherein the additional tensioning device that acts on the chain is arranged between the driving wheel and the further driven wheel that is connected to the compensating shaft, wherein a stationery guide rail for the chain is arranged between the driven wheel and the further driven wheel that is connected to the compensating shaft.

* * * * *